(12) United States Patent
Berrigan et al.

(10) Patent No.: US 7,346,652 B2
(45) Date of Patent: Mar. 18, 2008

(54) ASYNCHRONOUS DATA VALIDATION

(75) Inventors: Rebecca Berrigan, Auckland (NZ); John S. Harpour, Auckland (NZ)

(73) Assignee: First Data Corporation, Greenwood Village, CO (US)

( * ) Notice: Subject to any disclaimer, the term of this patent is extended or adjusted under 35 U.S.C. 154(b) by 634 days.

(21) Appl. No.: 10/144,196

(22) Filed: May 13, 2002

(65) Prior Publication Data
US 2003/0212740 A1 Nov. 13, 2003

(51) Int. Cl.
*G06F 15/16* (2006.01)
*G06F 15/167* (2006.01)
*G06F 17/30* (2006.01)

(52) U.S. Cl. .................. 709/203; 709/216; 709/219; 707/10

(58) Field of Classification Search ........... 709/202, 709/203, 205, 219, 229
See application file for complete search history.

(56) References Cited

U.S. PATENT DOCUMENTS

| | | | | |
|---|---|---|---|---|
| 5,784,562 | A * | 7/1998 | Diener | 709/217 |
| 6,209,029 | B1 * | 3/2001 | Epstein et al. | 709/219 |
| 6,292,827 | B1 * | 9/2001 | Raz | 709/217 |
| 6,421,693 | B1 * | 7/2002 | Nishiyama et al. | 715/507 |
| 6,446,120 | B1 * | 9/2002 | Dantressangle | 709/224 |
| 6,587,867 | B1 * | 7/2003 | Miller et al. | 709/200 |
| 6,662,340 | B2 * | 12/2003 | Rawat et al. | 715/507 |
| 6,820,236 | B1 * | 11/2004 | Bates et al. | 715/501.1 |
| 6,910,181 | B2 * | 6/2005 | Byrd et al. | 715/513 |
| 6,950,857 | B1 * | 9/2005 | Arnold | 709/217 |
| 2002/0073058 | A1 * | 6/2002 | Kremer et al. | 707/1 |
| 2003/0011632 | A1 * | 1/2003 | Gupta et al. | 345/747 |

OTHER PUBLICATIONS

Hind, Nicholas and Brettell, Ian, "Leveraging The Oracle Internet Platform: Developments at the Cutting-Edge of Enterprise Asset Management Software," An Oracle Corporation White Paper, May 1999.

* cited by examiner

*Primary Examiner*—Saleh Najjar
*Assistant Examiner*—Sargon N Nano
(74) *Attorney, Agent, or Firm*—Townsend and Townsend and Crew LLP (57) ABSTRACT

A system, method and computer readable medium for providing asynchronous validation of data entered into a field within a user interface is described. The method on a client information processing system provides two or more fields for entry of data within a client application. A field is a text field, button, menu or any other graphical user interface widget for entering data. Data entered into a first field is received. The client application automatically initiates the determination of whether the data entered into the first field is valid while concurrently allowing entry of data into other fields. This determination may be made in conjunction with a server application on a remote server information processing system. This step is repeated for all fields provided. Upon a finding that all data entered into the two or more fields is valid, the entered data is provided to the server information processing system.

16 Claims, 9 Drawing Sheets

Contact

| | | |
|---|---|---|
| Name | John Smith | 804 |
| Phone | 305-864-2397 | |
| Fax | 305... | |
| Email | jsmith | 806 |
| Position | Engineer | |

Email address missing domain

| | | |
|---|---|---|
| Business | Software ▽ | 808 |
| SIC | Select One | 810 |

Notes

Save    Cancel

ASYNCHRONOUS DATA VALIDATION

BACKGROUND OF THE INVENTION

1. Field of the Invention

This invention generally relates to the field of data validation and more specifically to asynchronous validation of data, in a client-server architecture.

2. Description of Related Art

As the use of the Internet and distributed networks increases, the exchange of information over long distances is increasing. Data validation over a distributed network, in particular, has enjoyed increasing popularity over the last few years. Users enter data into a graphical user interface (GUI) and the data is subsequently found to be valid or invalid by a server application. A common example of this is when a consumer enters personal and billing information into a series of web pages when purchasing a product over the Web. This process, however, can be long and time-consuming. Particularly, the user must often wait for validation of entered data before proceeding to enter more data. Thus, the user is often left to wait at the computer while validation processes. In addition, data validation sometimes occurs only after all data has been entered by the user. After a long wait, the user is often presented with a response indicating invalidity of entered data due to a minor error, such as entering date information in the wrong format (a two digit year code versus a four digit year code). This can be frustrating. The following describes in more detail the processes performed by the prior art.

Figure 1:
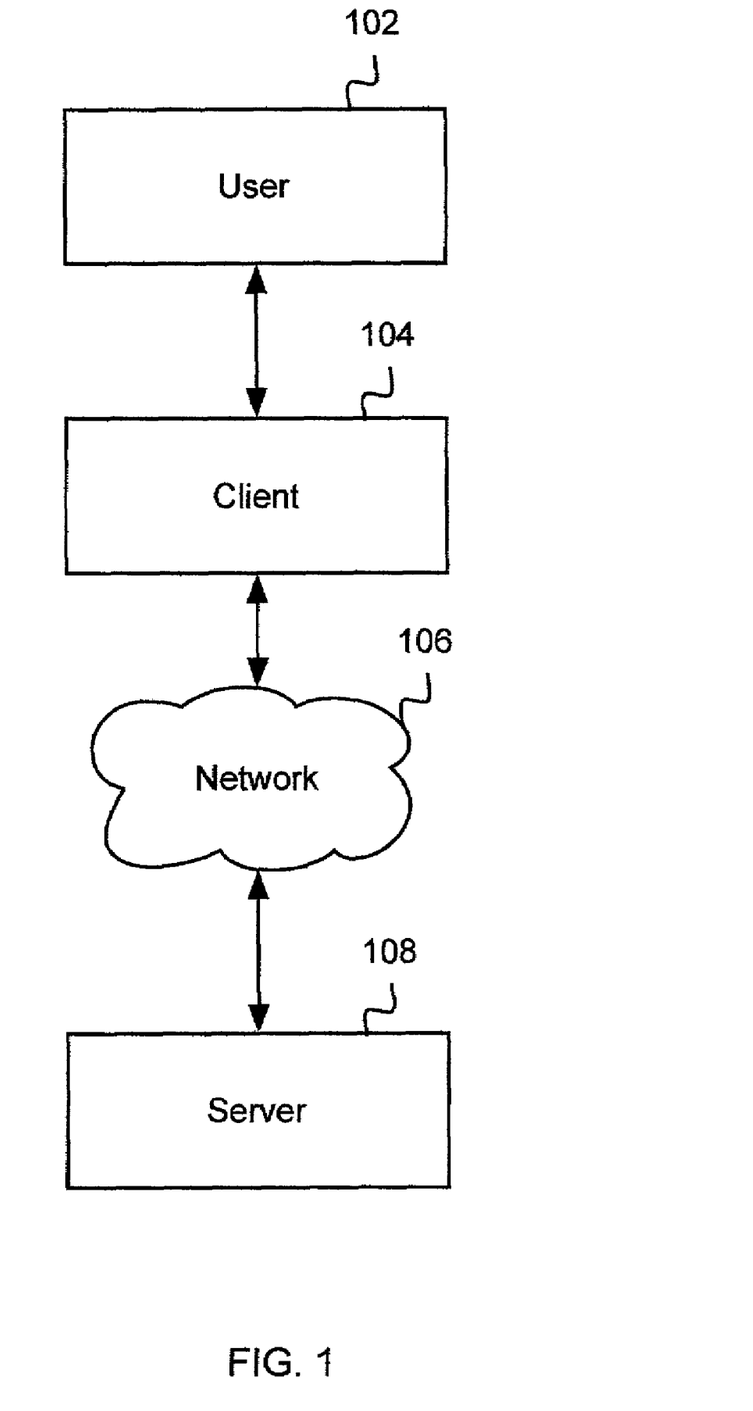
FIG. 1 is a block diagram illustrating the overall system architecture of a typical distributed data validation system.

FIG. 1 is a block diagram illustrating the overall system architecture of a typical distributed data validation system. A user 102 utilizes a client information processing system 104 (e.g., a computer) to enter data that is validated and saved by a server information processing system 108 (e.g., a web server) via a network 106 (e.g., the Internet). Typically, a client application such as a web browser that executes on client 104 provides data entry fields for entry of data by user 102. The entered data is then sent to a server application such as a Common Gateway Interface script that executes on server 108 for validation and storage of the entered data.

Figure 2:
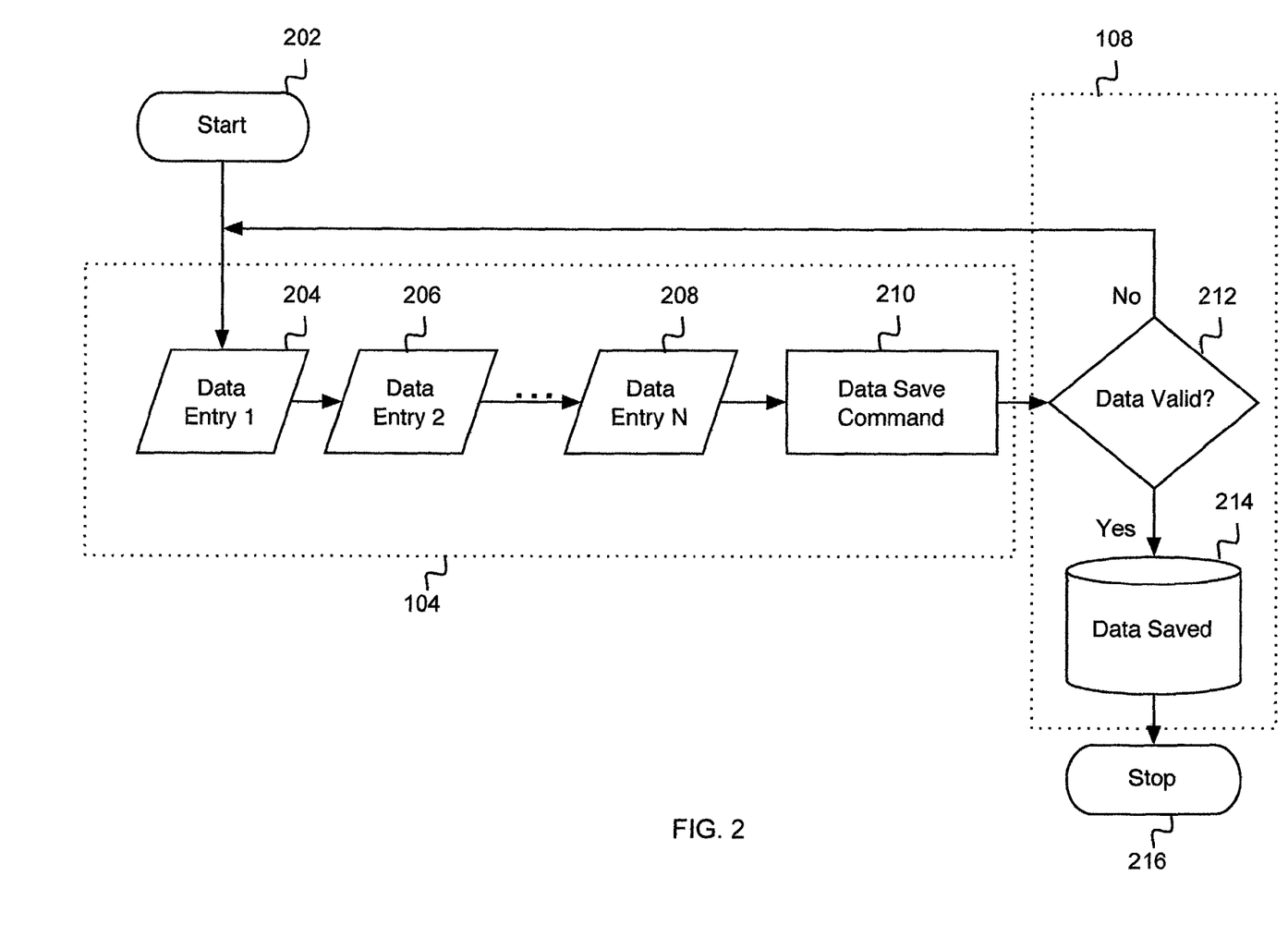
FIG. 2 is a flowchart depicting the overall operation and control flow of the data entry and validation processes of the prior art for multiple data entry field validations.

FIG. 2 is a flowchart depicting the overall operation and control flow of the data entry and validation processes of the prior art for multiple data entry field validation. The control flow of FIG. 2 begins with step 202 and flows directly to step 204. In steps 204 to 208, FIG. 2 shows that user 102 successively enters data into fields 1 through N provided by a client application executing on client 104. In step 210 the user 102 expresses a desire to save the data already entered. Alternatively, in step 210 the client application executing on the client 104 automatically asserts a command to save the data already entered. Consequently, the client application sends a message to a server application executing on server 108, wherein the message includes the data entered and a request to save the data entered. Note that steps 204 to 210 are executed by the user 102 and the client application on client 104.

Subsequently, server 108 receives the message sent by client 104 and proceeds to determine the validation status of the data already entered. This determination by server 108 is not timely. It would more constructive to receive feedback immediately after input of data in steps 204-208, instead of receiving feedback for all data entry fields all at once. This can be time-consuming and tedious.

If server 108 determines that the data entered is not valid, server 108 sends to client 104 a message indicating the invalidity of the entered data and control flows back to the first data entry position, in this example step 204. Thus, steps 204 to 212 are repeated over and over until the server 108 determines that the data entered is valid. Typically, when control flows back to step 204, the user 102 is presented with all data entry fields including information that indicates the reasons for invalidity of certain fields. This consumes resources and increases the time required to present a response to the user 102 that each data entry 1 through data entry N is valid If server 108 determines that the data entered by user 102 is valid, the data entered is saved by server 108. Then, server 108 sends to client 104 a message indicating the validity of the entered data. Note that steps 212 to 214 are executed by the server application on server 108. In step 216, the control flow ceases. Although this prior art technique of validating all the data entry 1 through N after the data save command 210 is useful, it is time-consuming for the end user 102 to wait until all the data entries are entered to commence data validation. Accordingly, a need exists to overcome this time required for data validation.

Figure 3:
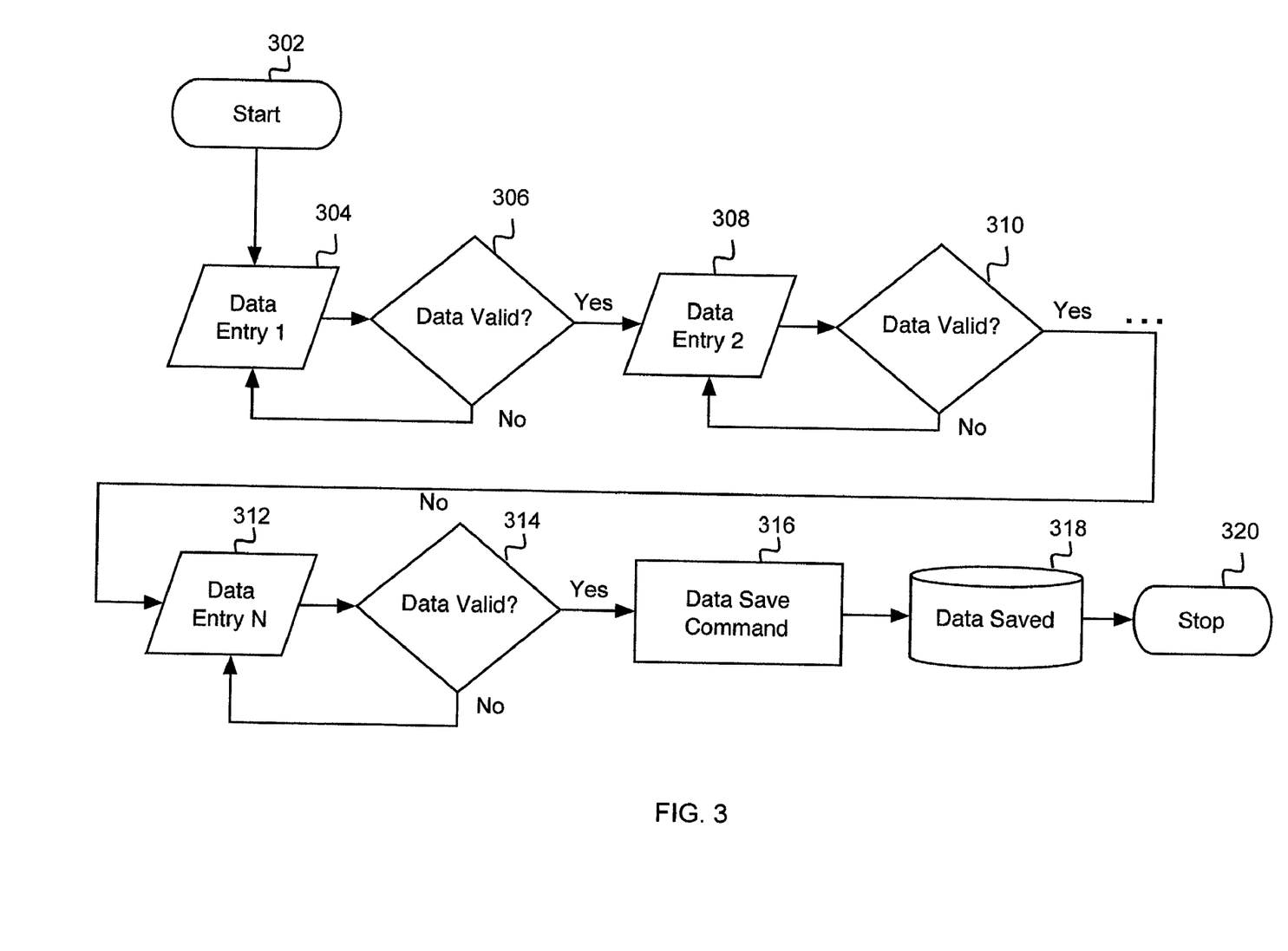
FIG. 3 is another flowchart depicting the overall operation and control flow of the data entry and validation processes of the prior art for individual data entry field validations.

Turning now to FIG. 3, shown is another flowchart depicting the overall operation and control flow of the data entry and validation processes of the prior art for individual data field validation. The control flow of FIG. 3 begins with step 302 and flows directly to step 304. In step 304, FIG. 3 shows that user 102 enters data into a data entry field provided by a client application executing on client 104. Next, in step 306, the client application sends a message to a server application executing on server 108, wherein the message includes the data entered. The server 108 receives the message sent by client 104 and proceeds to determine the validation status of the data entered. This determination by server 108 can require a considerable amount of time to accomplish. During this time, the user 102 must wait for a response from server 108 without being able to enter any additional data into other data entry fields. Again, this can be time-consuming and tedious.

If server 108 determines that the data entered is not valid, server 108 sends to client 104 a message indicating the invalidity of the entered data and the user 102 is given another opportunity to enter data into that data field, in this example step 304. Thus, steps 304 to 306 are repeated over and over until the server 108 determines that the data entered is valid. The sequence of steps represented by steps 304 and 306 is repeated for each data entry field 1 through N—steps 308 to 314. Thus, the total time consumed for the process is the sum of each determining step, i.e., the sum of each determining step for each data entry field 1 through N—steps 306, 310 and 314. This is disadvantageous as it increases the time necessary for a user 102 to obtain validation of entered data. It should be noted that the data entry fields 1 through N are not necessarily visited by the user 102 in the order of their designation.

In step 316, the user 102 indicates a desire to save the data already entered and the client application sends a message to the server application executing on server 108, wherein the message includes the data entered and a request to save the data entered. Then, the data entered by user 102 is saved by server 108. Note that steps 304, 308, 312, and 316 are executed by the user 102 and the client application on client 104. Also note that steps 306, 310, 312, and 318 are executed by the server application and server 108. Although this prior art technique of validating each data entry field sequentially is useful, it is very time-consuming to force the user 102 to wait for each field to validate prior to proceeding to the next field.

Therefore a need exists to overcome the problems with the prior art as discussed above, and particularly for a way to more efficiently validate data entered into a field within a user interface.

SUMMARY OF THE INVENTION

Briefly, in accordance with the present invention, disclosed is a system, method and computer readable medium for providing asynchronous validation of data entered into a field within a user interface. In an embodiment of the present invention, the method on a client information processing system provides two or more fields for entry of data within a client application. A field is a text field, a button, a menu or any other graphical user interface widget for entering data. Data entered into a first field is received. The client application automatically initiates the determination of whether the data entered into the first field is valid while concurrently allowing entry of data into other fields. This determination may be made in conjunction with a server application on a remote server information processing system. This step is repeated for all fields provided. Upon a finding that all data entered into the two or more fields is valid, the entered data is provided to the server information processing system.

This embodiment of the present invention is advantageous as it allows for the asynchronous validation of data entered into a first field while concurrently allowing entry of data into other fields. The present invention decreases the time necessary for a user to enter data into the client application. Further, this embodiment allows the client application on the client information processing system to share the burden of executing the validation of the entered data. This feature decreases the processing burden on the remote server information processing system and allows it to devote its resources to other tasks.

In one embodiment of the present invention, the first field is decorated in a first style immediately upon entry of data into the first field to indicate the pending status of the validation of the first field. Further, if the determining step results in the lack of validity of the data in a field, the field is decorated in a second style to indicate lack of validity of the field. Lastly, if the determining step results in the validity of the data in a field, the field is decorated in a third style to indicate validity of the field. This embodiment of the present invention is advantageous as it allows a user to easily be aware of the validation status of a field. This feature decreases the time necessary for a user to enter data into the client application.

In another embodiment of the present invention, the client application comprises validation parameters for executing the determining step. In this embodiment, the validation parameters may be updated without updating the entire client application. This embodiment of the present invention is advantageous as it allows the determining step to be modified quickly and easily without necessitating a time-consuming update to the client application. This feature increases the usability and the modifiability of the client application.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

Terminology

To more clearly delineate the present invention, an effort is made throughout the specification to adhere to the following term definitions as consistently as possible.

The term "browser" or "web browser" refers to a computer program, such as Netscape Navigator or Microsoft Internet Explorer, useful for viewing a web page.

The term "user" refers to a person interacting with a computer system.

The term "server application" refers to a program that is located and executes on the server side of a client-server system. Examples of widely used server applications are: Common Gateway Interface (CGI) scripts, Java servlets, Hypertext Preprocessor (PHP) scripts and Perl scripts.

The term "client application" refers to a program that is located and executes on the client side of a client-server system. Examples of widely used client applications are: Java applets, Java scriptlets, Java scripts and Active X controls.

The term "widget" refers to any element of a graphical user interface (GUI). Examples of widgets are graphics, buttons, text fields, scroll bars, menu bars, window panes and pull-down menus.

The term "field" or "data entry field" refers to a GUI widget that is utilized by a user for entering data into the GUI. Examples of fields are buttons, text fields, sets of radio buttons, scroll menus, pull-down menus, sets of selections (each with a corresponding checkbox) and clickable graphics.

The term "valid" or "validity" refers to information that is in the form required for acceptance. Validity may depend on many factors. For example, validity of information may depend on whether a server can verify the information. In another example, validity of information may depend on the format of the information. Conversely, the term "invalid" or "invalidity" refers to information that is not in the form required for acceptance.

Overview

The present invention, according to a preferred embodiment, overcomes problems with the prior art by providing asynchronous validation of data entered into data entry fields provided on a user interface. The exemplary embodiments of the present invention provide a system wherein validation of entered data occurs concurrently with entry of data into other data entry fields.

As previously described above, FIG. 1 is a block diagram illustrating the overall system architecture of a typical distributed data validation system. The exemplary embodiments of the present invention adhere to the system architecture of FIG. 1. A user 102 utilizes a client application on a client system 104 to enter data that is validated and saved by a server application on a server system 108 via a network 106. In an embodiment of the present invention, the client application is a Java applet, a Java scriptlet, Java script, Perl script or an Active X control. In another embodiment of the present invention, the server application is a Common Gateway Interface (CGI) script, a Java servlet, a Hypertext Preprocessor (PHP) script or a Perl scripts.

In an embodiment of the present invention, the computer systems of client 104 and server 108 are one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other information processing devices. In another embodiment of the present invention, the computer systems of client 104 and server 108 are server systems (e.g., SUN Ultra workstations running the SunOS operating system or IBM RS/6000 workstations and servers running the AIX operating system).

In an embodiment of the present invention, FIG. 1 shows network 106 for connecting client 104 to server 108. In one embodiment of the present invention, network 106 is a circuit switched network, such as the Public Service Telephone Network (PSTN). In another embodiment of the present invention, the network 106 is a packet switched network. The packet switched network is a wide area network (WAN), such as the global Internet, a private WAN, a local area network (LAN), a telecommunications network or any combination of the above-mentioned networks. In another embodiment of the present invention, network 106 is a wired network, a wireless network, a broadcast network or a point-to-point network. In another embodiment of the present invention, client 104 executes on the same computer system as the computer system of server 108, which would negate the need for network 106.

Client System

Figure 4:
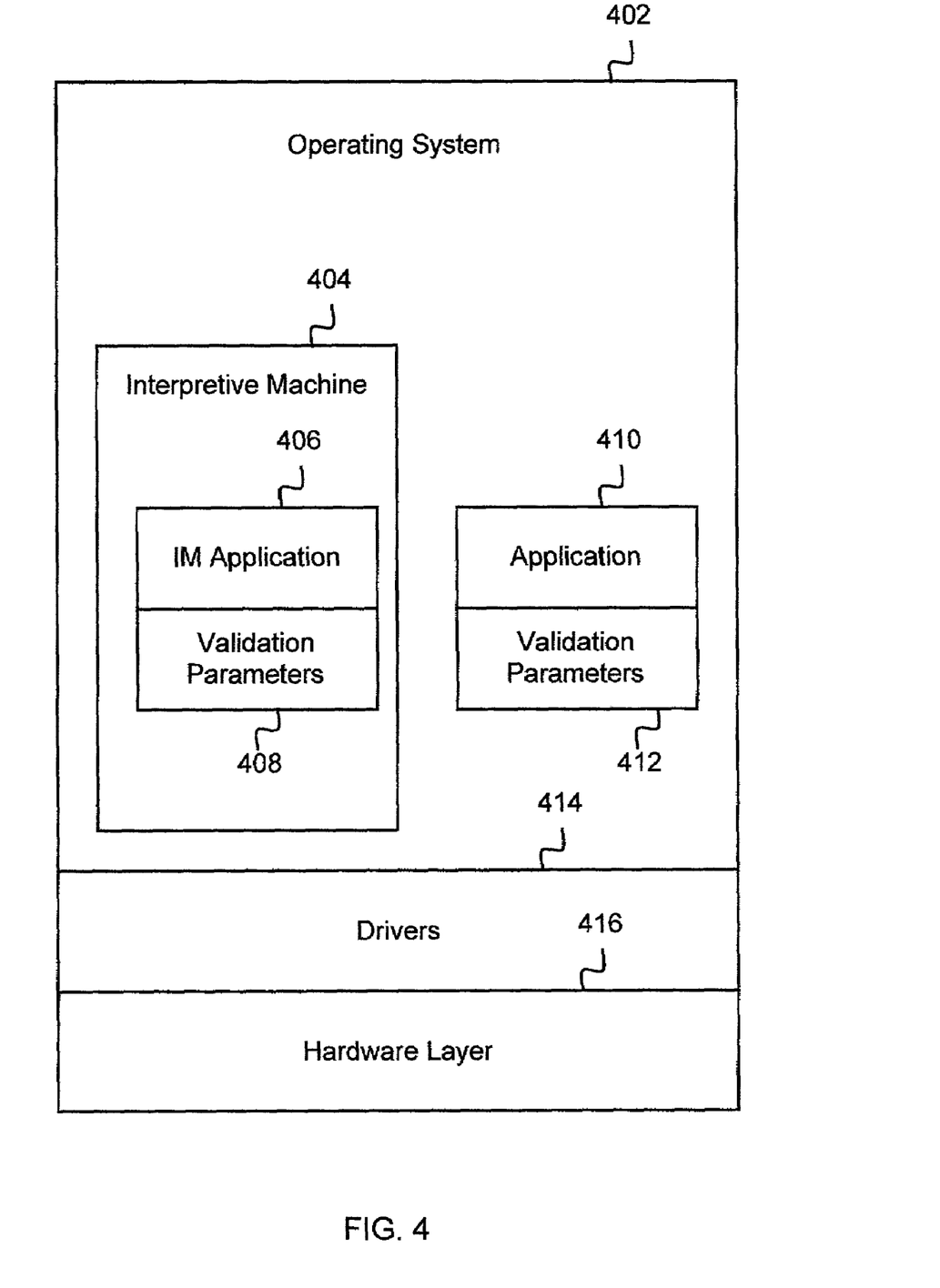
FIG. 4 is a block diagram depicting the software hierarchy of a computer system useful for implementing an embodiment of the present invention.

FIG. 4 is a block diagram depicting the software hierarchy of a computer system useful for implementing an embodiment of the present invention. FIG. 4 provides more detail of the computer system of client 104. FIG. 4 shows an operating system 402 that communicates with the drivers 414 of the computer system for controlling the hardware layer 416. As described above, the operating system 402 is the Microsoft Windows 95/98/2000/ME/CE/NT/XP operating system, the Mac operating system, the Sun operating system or the AIX operating system. The hardware layer 416 comprises all hardware components of the computer system of client 104, including the hard disk, the processor, the memory and other peripherals. The hardware components of the computer system of client 104 are described in greater detail below. The drivers 414 include the computer instructions necessary for controlling the hardware components of the hardware layer 416 of the computer system of client 104.

FIG. 4 also shows application 410 together with validation parameters 412, which execute in operating system 402. Application 410 is any computer program that executes on the computer system of client 104 for the purpose of allowing user 102 to enter data for validation. In an embodiment of the present invention, application 410 is a web browser such as Netscape Navigator or Microsoft Internet Explorer. In another embodiment of the present invention, application 410 is an interface to a database, such as an Oracle database. In yet another embodiment of the present invention, application 410 is a text-based terminal program.

Lastly, FIG. 4 shows interpretive machine (IM) 404, which executes in operating system 402. Interpretive machine 404 is directed towards a computer program that produces an environment for the execution of IM applications. An example of an interpretive machine is the Java Virtual Machine, which is a computer program that produces an environment in which Java applications may execute. FIG. 4 also shows IM application 406 together with validation parameters 408, which execute in interpretive machine 404. IM application 406 is also any computer program that executes on the computer system of client 104 for the purpose of allowing user 102 to enter data for validation. In an embodiment of the present invention, IM application 406 is a Java applet. IM application 406 also executes in conjunction with validation parameters 408.

In an embodiment of the present invention, the pertinent application of the client 104 is a mixture of application 410 and application 406. That is, the pertinent application executes both within operating system 402 and in interpretive machine 404. One example of this embodiment is an application 410 comprising a web browser, such as Microsoft Internet Explorer, which executes completely within operating system 402. However, the web browser is supplemented by a Java Applet, which is received from a third party, such as server 108. This Java Applet executes in conjunction with the web browser, but necessitates the Java virtual machine (i.e., interpretive machine 404) to operate. Thus, the client application comprises a web browser, which interacts with the operating system 402, and a Java Applet, which interacts with interpretive machine 404.

Validation parameters 412 and 408 define the requirements that must be met by entered data in order to be valid. A validation parameter can take a variety of forms, including data format, data length and data authentication. An example of a data format parameter is a requirement that date information be entered in the following format: mm/dd/yyyy (i.e., 02/02/2002 for Feb. 2, 2002). An example of a data length parameter is a requirement that a short description of a product be less than or equal to 100 characters. An example of a data authentication parameter is a requirement that an entered credit card number be authenticated by a credit card authorization server.

The existence of validation parameters 408 and 412 as separable modules of application 410 and IM application 406 is advantageous as it allows validation parameters to be updated without requiring the entire client application to be updated. An update can be time-consuming and complex. Thus, this feature is advantageous as it increases the modifiability and usability of the client application. It should be noted, however, that the separations between 406 and 408, and between 410 and 412 may be degenerate. That is, some of the validation parameter values may be hard coded in the application 410 or the IM application 406. In this case, the advantage of the present invention due to separate modules for validation parameters would not be present.

Operation of the Invention

Figure 5:
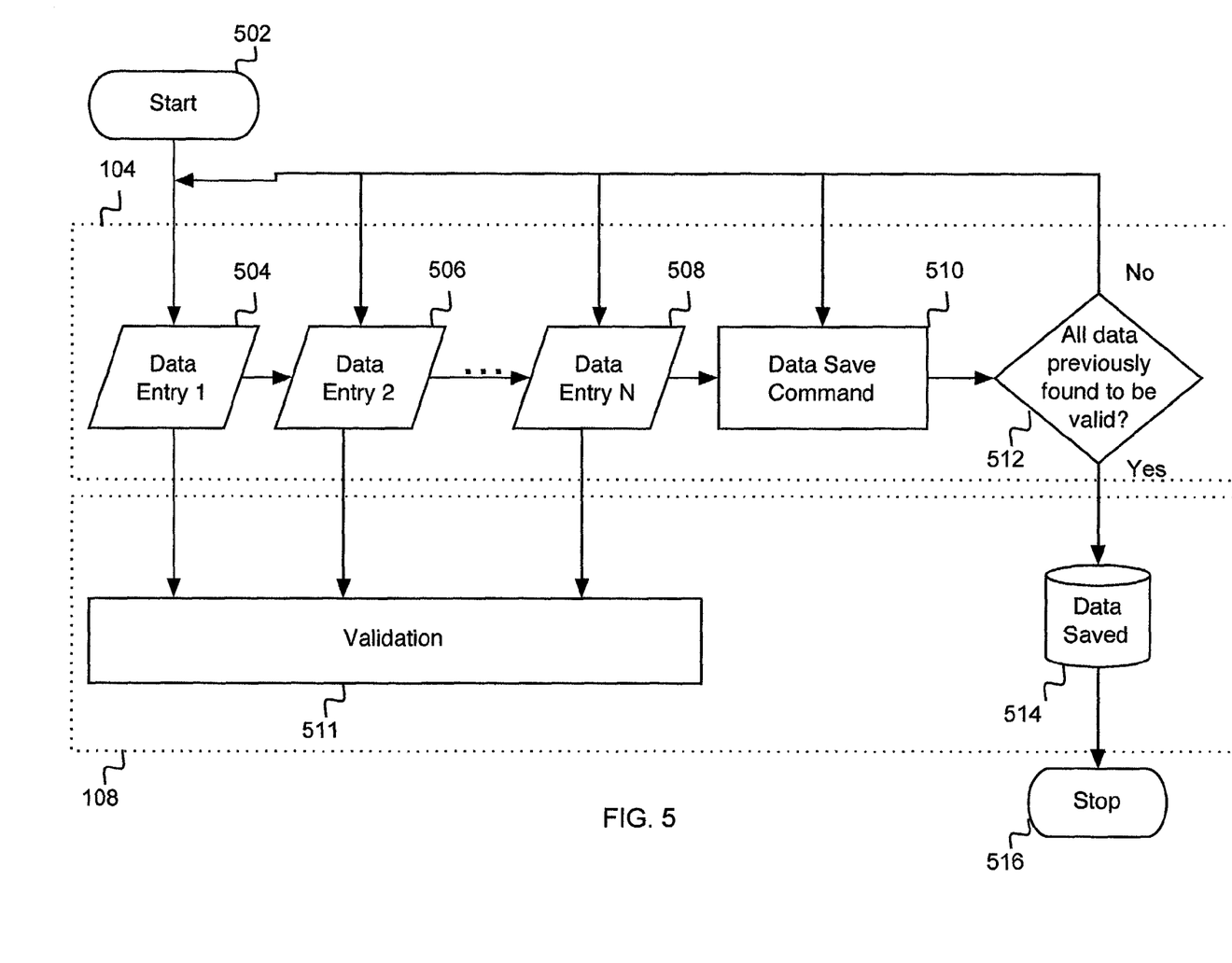
FIG. 5 is a flowchart depicting the overall operation and control flow of the asynchronous data entry and validation processes of one embodiment of the present invention.

FIG. 5 is a flowchart depicting the overall operation and control flow of the asynchronous data entry and validation processes of one embodiment of the present invention. FIG. 5 shows data entry steps 504-508 for data entry fields 1-N, the validation step 511 and the data save step 514. It should be noted that although data entry steps 504-508 are sequential and indicate that the user 102 must visit one data entry field before moving on to the next data entry field, the present invention also embodies the non-sequential visiting of data entry fields 1-N in data entry steps 504-508. In this embodiment, the user 102 is able to visit any data entry field 1-N in steps 504-508 at any time in order to correct or modify data that has been entered previously.

The control flow of FIG. 5 begins with step 502 and flows directly to step 504. In step 504, FIG. 5 shows that user 102 enters data into a data entry field provided by the client application on client 104. Immediately upon entry of data, two threads of control are created. One thread flows directly to the next data entry step 506. The second thread flows directly to the validation step 511. The validation step, also known as the determining step, is described in greater detail below. Thus, as validation of the data already entered is processing, the user 102 can continue to enter data into remaining data entry fields. Note that as the first thread flows to the next data entry step 506, a period of time may pass before data entry step 506 as the user 120 may hesitate before entering data.

The events of step 504 are repeated in steps 506 and 508 for data entry fields 1 through N. In one embodiment of the present invention, in step 510 the user 102 expresses a desire to save the data already entered. The user 102 may accomplish this by pressing a save button, selecting a save selection from a pull-down menu or simply completing entry of data into a data entry field. In another embodiment of the present invention, in step 510 the client application executing on the client 104 automatically asserts a command to save the data already entered. Consequently, control flows to step 512. Note that steps 504 to 512 are executed by the user 102 and the client application on client 104.

In step 512, the client application on client 104 determines whether all of the data entered in steps 504 to 510 has previously been found to be valid in step 511. If all of the data entered in the determining step has previously been found to be valid in step 511, control flows to step 514. Then, in step 514, the data entered by user 102 is saved by server 108. If at least some of the data entered has previously been found to be invalid in step 511, control flows back to the data entry steps 504 to 508. At this point, the user 102 may modify entered data which was found to be invalid in step 511. In another embodiment of the present invention, the user 102 is presented with information regarding the invalidity of any entered data. This embodiment is described in greater detail below. In step 516, the control flow ceases. Note that steps 512 to 514 are executed by the server application and server 108.

The multi-threaded feature of the present invention is advantageous as it allows a user 102 to continue to enter data into remaining data entry fields while the validation of the data already entered is processing. This feature of the present invention allows the user 102 to utilize the time that, in the prior art, he would be spending waiting for validation to process. Ultimately, this feature results in a decrease in time and effort necessary for a user 102 to enter data.

Figure 6:
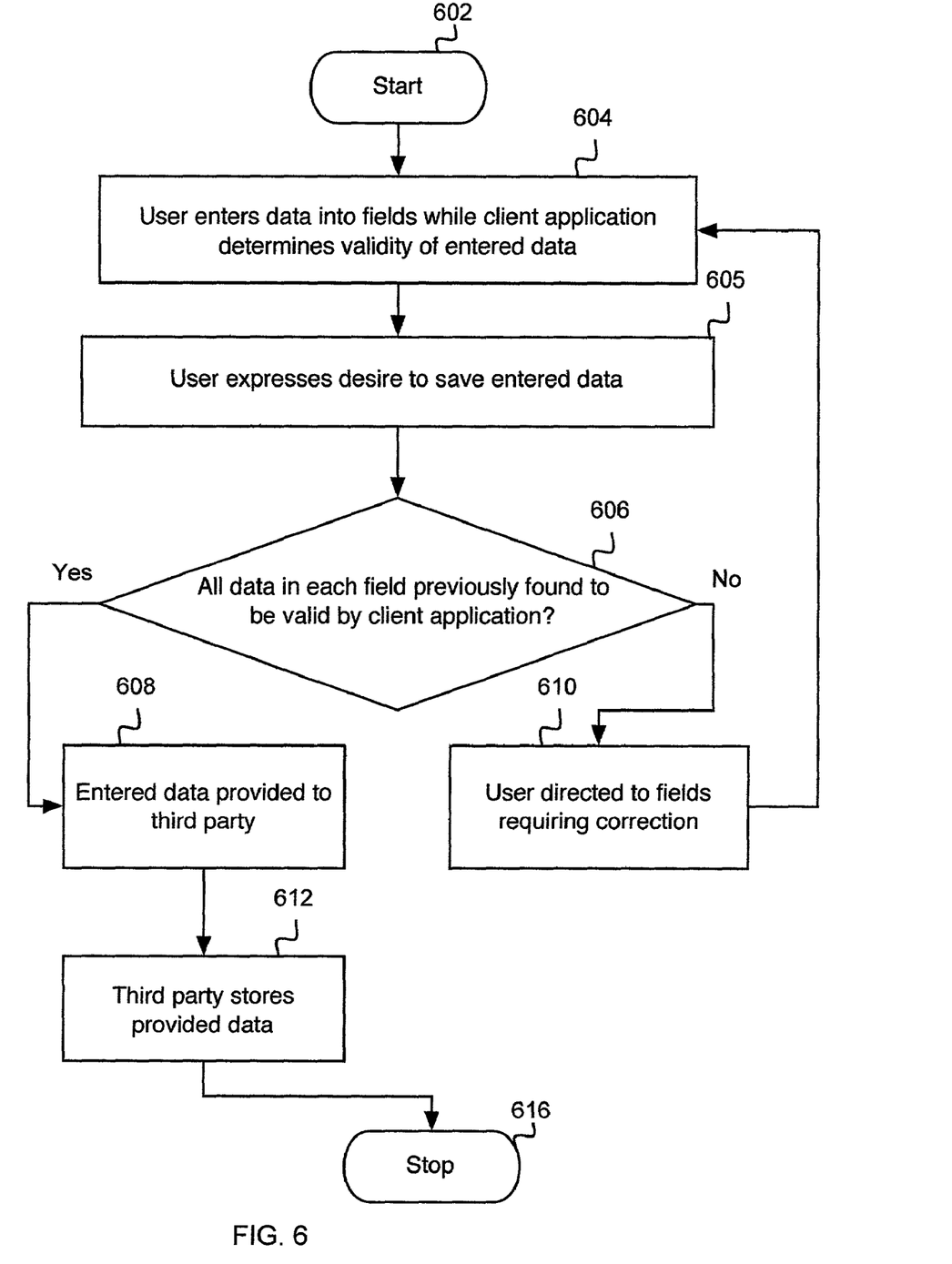
FIG. 6 is a flowchart depicting a more detailed operation and control flow of the asynchronous data entry and validation processes of one embodiment of the present invention.

FIG. 6 is a flowchart depicting a more detailed operation and control flow of the asynchronous data entry and validation processes of one embodiment of the present invention. The control flow of FIG. 6 begins with step 602 and flows directly to step 604. In step 604, FIG. 6 shows that user 102 enters data into all of the data entry fields provided by the client application on client 104, while the client application determines the validity of the entered data. Step 604 corresponds to steps 504 to 511 in FIG. 5. Next, in step 605, the user expresses a desire to save the entered data. Step 605 corresponds to step 510 in FIG. 5.

In step 606, the client application on client 104 determines whether all of the data entered in step 604 has previously been found to be valid. If all of the data entered has previously been found to be valid, control flows to step 608. Step 606 corresponds to step 512 in FIG. 5. Then, in step 608, the data entered by user 102 is provided to a third party, such as server 108, and the entered data is saved by the third party in step 612. Step 608 corresponds to step 514 in FIG. 5. If at least some of the data entered has previously been found to be invalid, control flows to step 610 wherein the user 102 is directed to the fields corresponding to the entered data which was found to be invalid. Then, control flows back to step 604 and the user 102 corrects the incorrect fields. In this fashion, the user 102 continues to enter data in the data entry fields until all of the entered data is found to be valid. In step 616, the control flow ceases.

Figure 7:
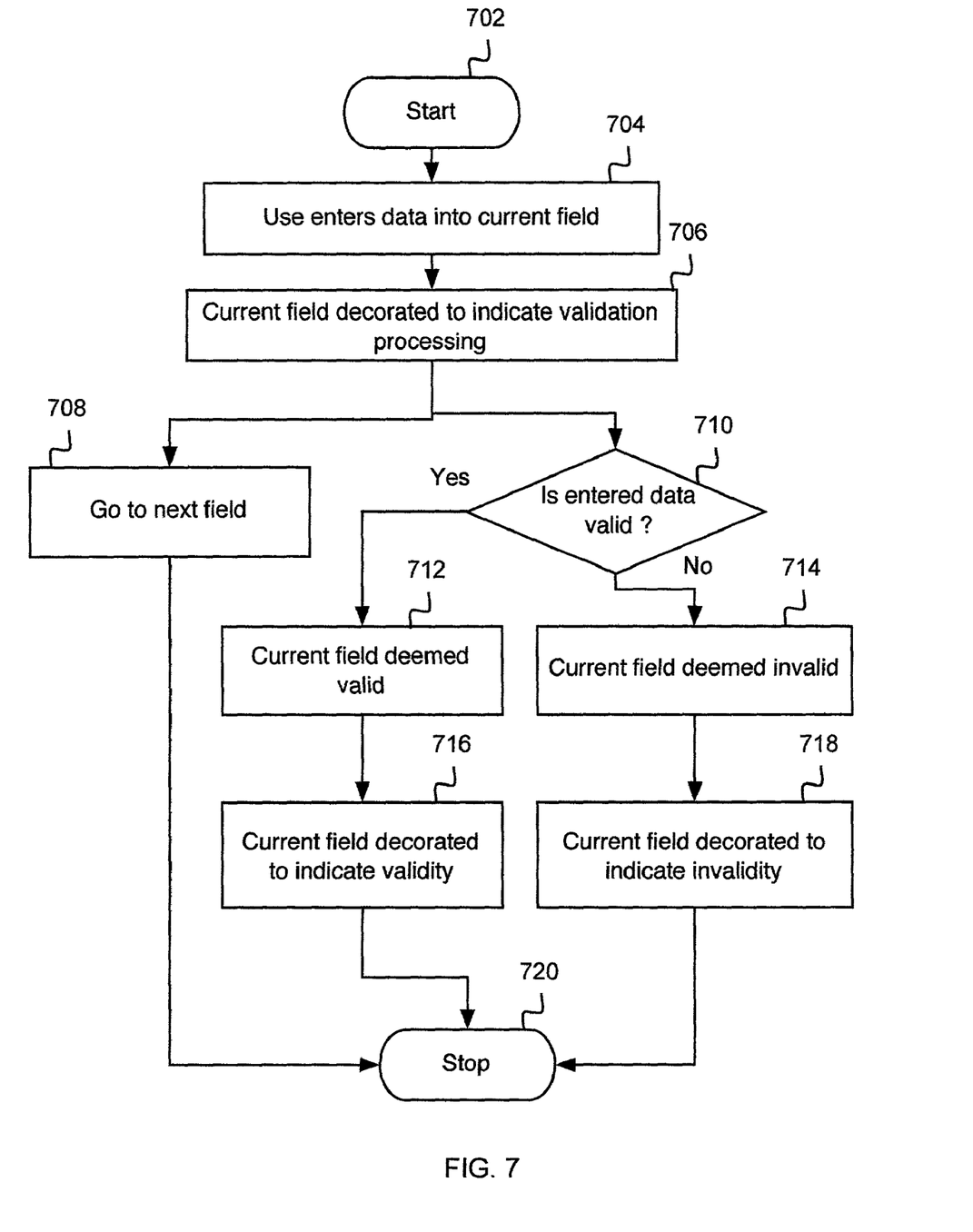
FIG. 7 is a flowchart depicting the operation and control flow of the asynchronous data entry and validation processes for one field, in one embodiment of the present invention.

FIG. 7 is a flowchart depicting the operation and control flow of the asynchronous data entry and validation processes for one field, in one embodiment of the present invention. FIG. 7 represents the functions associated with the entry of data into one field, such as steps 504 and 511 of FIG. 5. The control flow of FIG. 7 begins with step 702 and flows directly to step 704. In step 704, FIG. 7 shows that user 102 enters data into the current data entry field provided by the client application on client 104. Step 704 corresponds to step 504 in FIG. 5. Then, in step 706, the current data field is decorated in a first style (preferably with a blue-colored outline) to indicate that the validation status of the current field is pending. Decorating is described in greater detail below. At this juncture, as shown in FIG. 5, the control flow of FIG. 7 spawns two separate threads. The first thread flows to step 708 while the second thread flows to step 710. In step 708, the user 102 is allowed to proceed to the next field to enter data.

In step 710, the server application on server 108 determines whether the data entered into the current field is valid. Step 710 corresponds to step 511 of FIG. 5. If the data entered into the current field is valid, in step 712, the current field is deemed to be valid. Subsequently, in step 716, the current data field is decorated in a second style. If the data entered into the current field is not valid, in step 714, the current field is deemed to be invalid. Subsequently, in step 718, the current data field is decorated in a third style (preferably in a red-colored outline). In step 720, the control flow ceases. It should be noted that the control flow of FIG. 7 represents the functions associated with the entry of data into one field, and, thus, when the operation of the entire invention is performed, the control flow of FIG. 7 is actually executed once for every data entry field.

Distributed Validation

In an embodiment of the present invention, the validation of the entered data, as described in step 511 of FIG. 5, step 604 of FIG. 6 and step 710 of FIG. 7, is executed by the client application on client 104 in conjunction with the server application on server 108. In this embodiment, the validation of entered data is commenced by the transmission of a message to the server application on server 108, wherein the message includes the entered data and a request to validate the entered data. Upon receipt of the transmitted data, the server application executes the identical validation process as would be executed by the client application in the previous embodiment. Subsequently, the server application forwards the result of the validation process to the client application.

This embodiment provides an advantageous feature in that the server 108 is already in possession of the validated data upon completion of entry of data by the user 102. Thus, in step 514 of FIG. 5, the server 108 is already in possession of the data to be saved. Consequently, in step 514, it is not necessary for the client application to send the validated data to server 108, but rather only a request to save the entered data. This also applies to FIG. 6. In step 608, the server 108 is already in possession of same validated data. Likewise, in step 612, it is not necessary for the client application to send all of the entered data to the server 108 for storage.

Decorating

Figure 8:
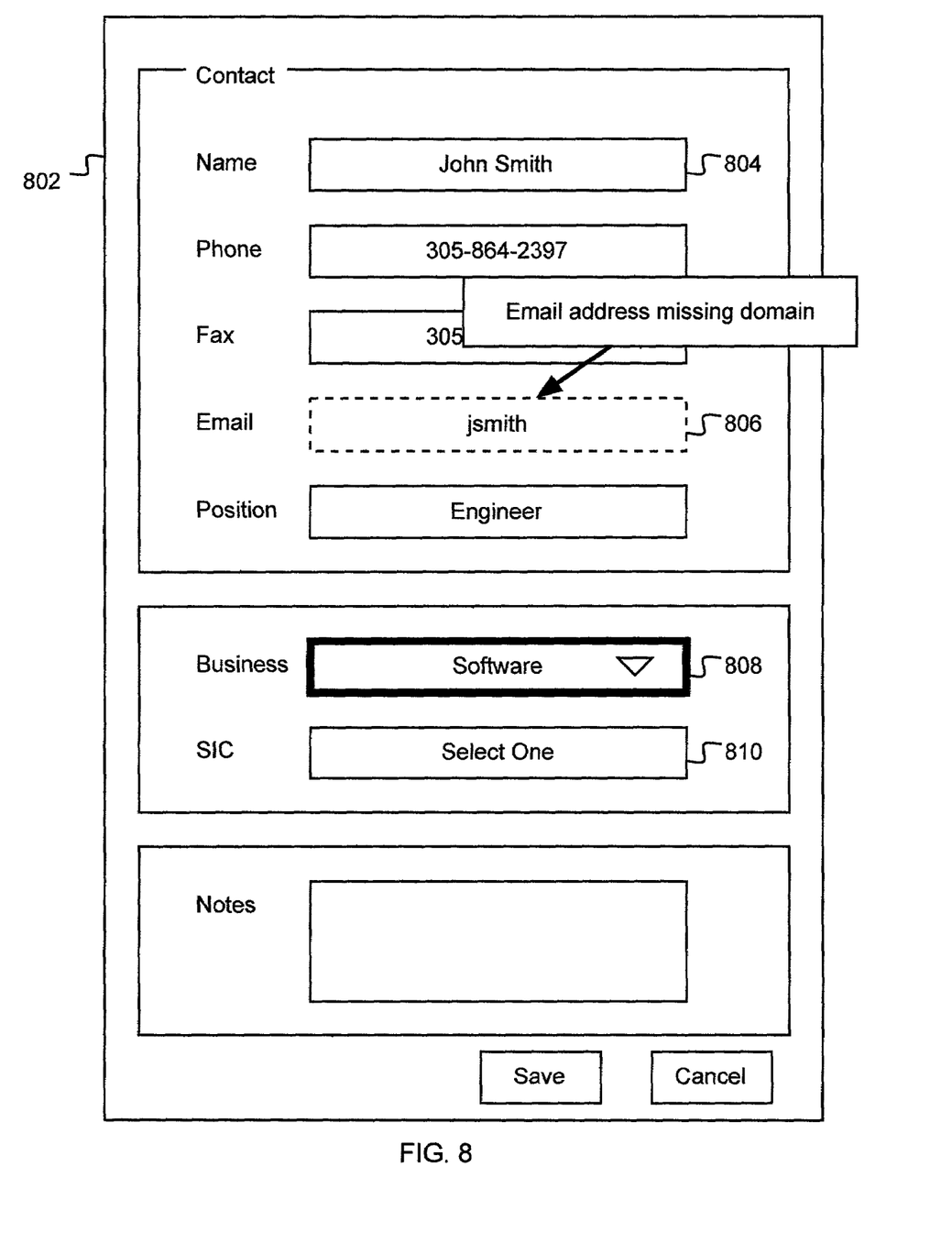
FIG. 8 is a screenshot of a graphical user interface implementing one embodiment of the present invention.

FIG. 8 is a screenshot of a graphical user interface 802 implementing one embodiment of the present invention. GUI 802 is an exemplary embodiment of a client application on client 102 for entering data to be validated. GUI 802 shows a group of text field widgets into which text is to be entered by the user 102. In an embodiment of the present invention, decorating of fields can take a variety of forms. The decorating of a field can consist of any of:

outlining the field in a solid or a non-continuous line
  outlining the field in a color
  coloring the background of the field
  rendering a graphic in the background of the field
  rendering a graphic or a color beside the field
  displaying text near the field, wherein the text may be associated with the validation status of the field
  playing audio associated with the field, wherein the audio may be associated with the validation status of the field Referring to FIG. 8, the Name text field 804 is decorated using a light shade to indicate that the field is mandatory. Thus, the user 102 must enter valid data into field 804 in order to acquire validation of the current set of fields. The Email text field 806 is outlined in a dotted line to indicate that the field has been found to be invalid. Preferably, an invalid field is outlined in the color red. The decorating of a field in this manner is beneficial as it enables a user 102 to easily be aware of the invalidity of the data in field 806. This allows the user 102 to quickly proceed to correct the invalid data.

Further, the Email text field 806 is accompanied by text that indicates a reason as to why the data in field 806 is invalid. This text immediately provides pertinent validity information to the user 102 and allows him to quickly proceed to correct the data in field 806. Next, the Business text field 808 is outlined with a solid line to indicate that the field has been found to be valid. Preferably, a valid field is outlined in the color blue. The decorating of a field in this manner is beneficial as it enables a user 102 to easily be aware of the validity of the data in field 808 and can theretofore concentrate on other fields. Lastly, the SIC text field 810 presents the user 102 with a pull-down menu widget for selecting data. The pull-down menu widget represents an alternative to the text field widget for entering data into GUI 802.

In an embodiment of the present invention, the current data input position in the GUI 802 is displayed to the user utilizing any procedure known to one of ordinary skill in the art for doing so. For example, the current data input position can be indicated by a blinking cursor or a blinking box.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 9:
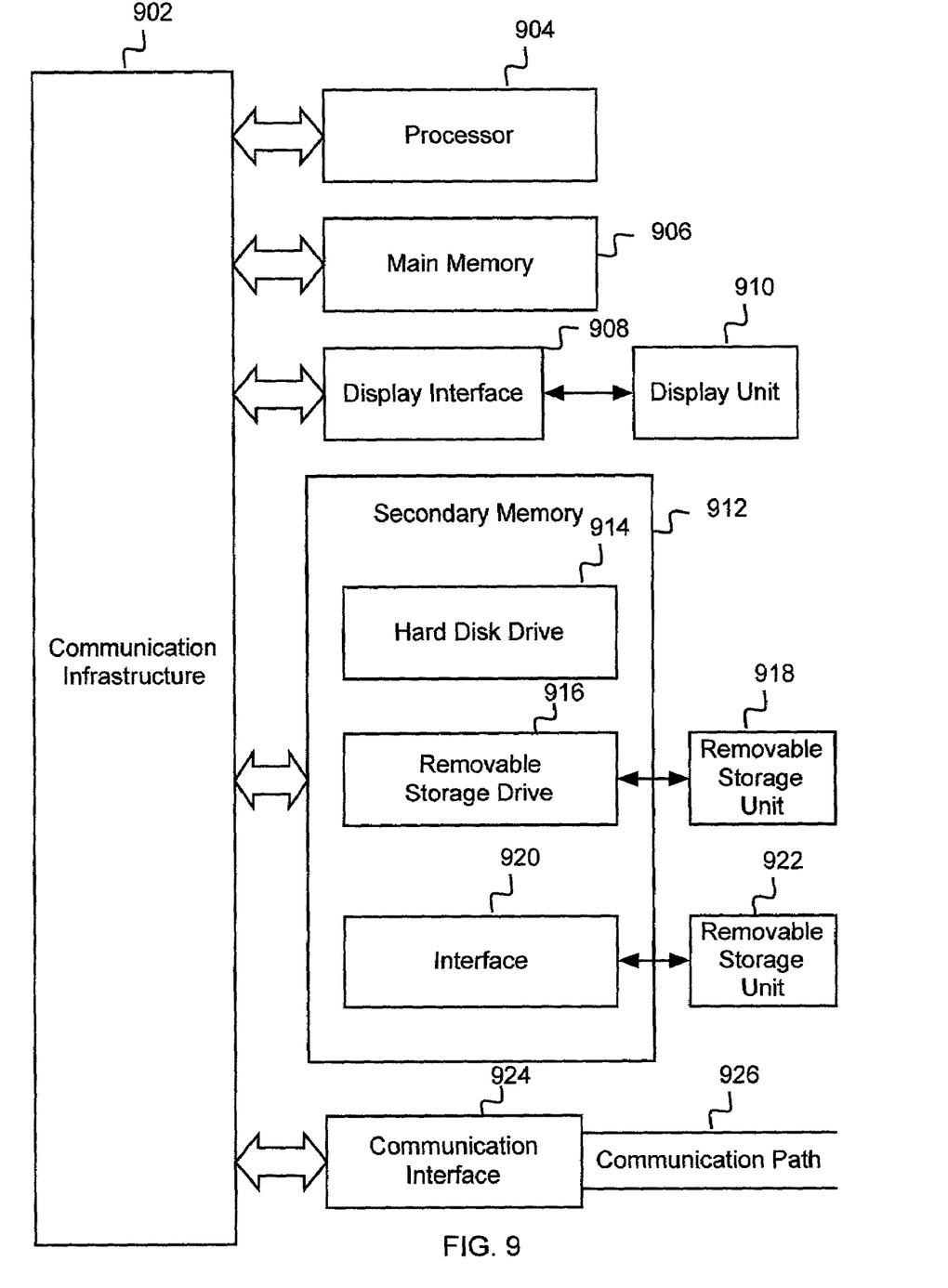
FIG. 9 is a block diagram depicting the hardware hierarchy of a computer system useful for implementing an embodiment of the present invention.

FIG. 9 is a block diagram depicting the hardware hierarchy of a computer system useful for implementing an embodiment of the present invention. The computer system includes one or more processors, such as processor 904. The processor 904 is connected to a communication infrastructure 902 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 908 that forwards graphics, text, and other data from the communication infrastructure 902 (or from a frame buffer not shown) for display on the display unit 910. The computer system also includes a main memory 906, preferably random access memory (RAM), and may also include a secondary memory 912. The secondary memory 912 may include, for example, a hard disk drive 914 and/or a removable storage drive 916, representing a floppy disk drive, a magnetic tape drive, an optical disk drive, etc. The removable storage drive 916 reads from and/or writes to a removable storage unit 918 in a manner well known to those having ordinary skill in the art. Removable storage unit 918, represents a floppy disk, magnetic tape, optical disk, etc. which is read by and written to by removable storage drive 916. As will be appreciated, the removable storage unit 918 includes a computer usable storage medium having stored therein computer software and/or data.

In alternative embodiments, the secondary memory 912 may include other similar means for allowing computer programs or other instructions to be loaded into the computer system. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to the computer system.

The computer system may also include a communications interface 924. Communications interface 924 allows software and data to be transferred between the computer system and external devices. Examples of communications interface 924 may include a modem, a network interface (such as an Ethernet card), a communications port, a PCM-CIA slot and card, etc. Software and data transferred via communications interface 924 are in the form of signals which may be, for example, electronic, electromagnetic, optical, or other signals capable of being received by communications interface 924. These signals are provided to communications interface 924 via a communications path (i.e., channel) 926. This channel 926 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 906 and secondary memory 912, removable storage drive 916, a hard disk installed in hard disk drive 914, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 906 and/or secondary memory 912. Computer programs may also be received via communications interface 924. Such computer programs, when executed, enable the computer system to perform the features of the present invention as discussed herein. In particular, the computer programs, when executed, enable the processor 904 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method on a client information processing system for providing validation of data, comprising:
   providing two or more fields for entry of data on a display screen of a client information processing system;
   receiving data via a first field and displaying the received data on the display screen;
   upon completion of receiving data via the first field, automatically determining whether the data entered into the first field is valid by transmitting the data in the first field to a server information processing system to validate the data, while concurrently allowing entry of data into another field of the two or more fields;
   repeating the receiving step and the determining step for one or more of the remaining two or more fields;
   if the data in any of the fields is invalid, transmitting from the server information processing system to the client information processing system information indicating the data is invalid; and
   providing to the server information processing system, upon the determination that data entered into the two or more fields is valid, the data entered into the two or more fields.

2. The method of claim 1, wherein the providing two or more fields comprises:
   providing a user interface on the display screen including two or more fields for entry of data, wherein a field comprises any one of:
   a text field
   a button;
   a set of radio buttons;
   a set of selections, each with a corresponding checkbox;
   a pull-down menu; and
   a scroll menu.

3. The method of claim 2, further comprising a step after the receiving step of:
   decorating the first field in a first style.

4. The method of claim 3, further comprising a step before the second providing step of:
   wherein if the data entered into the first field is valid, decorating the first field in a second style, and wherein if the data entered into the first field is not valid, decorating the first field in a third style.

5. The method of claim 4, wherein decorating the first field comprises any one of:
coloring the first field;
outlining the first field;
generating a graphic associated with the first field; and
generating a sound associated with the first field.

6. The method of claim 1, wherein a client application comprises any one of:
a Java Applet executing on the client information processing system;
a Java script executing on the client information processing system;
a Java scriptlet executing on the client information processing system; and
an ActiveX control executing on the client information processing system.

7. The method of claim 1, further comprising:
providing an indicator of the current data input position in the two or more fields.

8. The method of claim 1, wherein the determining step comprises:
determining, in conjunction with a server application on the server information processing system, whether the data entered into the first field is valid, while concurrently allowing entry of data into another field of the two or more fields.

9. The method of claim 8, wherein the client application comprises validation parameters which are updated by the server application without requiring a complete update of the client application, wherein the validation parameters are used in the determining step.

10. A computer readable medium on a client information processing system including computer instructions for providing validation of data, the computer instructions comprising instructions for:
providing two or more fields for entry of data on a display screen of a client information processing system;
receiving data via a first field and displaying the received data on the display screen;
upon completion of receiving data via the first field, automatically determining, whether the data entered into the first field is valid by transmitting the data in the first field to a server information processing system to validate the data, while concurrently allowing entry of data into another field of the two or more fields;
repeating the receiving instructions and the determining instructions for one or more of the remaining two or more fields;
if the received data in any of the fields is invalid, transmitting from the server information processing system to the client information processing system information indicating the data is invalid; and
providing to a server information processing system, upon the determination that data entered into the two or more fields is valid, the data entered into the two or more fields.

11. The computer readable medium of claim 10, wherein a client application comprises any one of:
a Java Applet executing on the client information processing system;
a Java script executing on the client information processing system;
a Java scriptlet executing on the client information processing system; and
an ActiveX control executing on the client information processing system.

12. The computer readable medium of claim 10, further comprising instructions for:
providing an indicator of the current data input position in the two or more fields.

13. The computer readable medium of claim 10, wherein the instructions for providing two or more fields comprises instructions for:
providing a user interface including two or more fields for entry of data, wherein a field comprises any one of:
a text field;
a button;
a set of radio buttons;
a set of selections, each with a corresponding checkbox;
a pull-down menu; and
a scroll menu.

14. The computer readable medium of claim 13, further comprising instructions after the receiving instructions for:
decorating the first field in a first style.

15. The computer readable medium of claim 14, further comprising instructions before the second providing instructions for:
wherein if the data entered into the first field is valid, decorating the first field in a second style, and wherein if the data entered into the first field is not valid, decorating the first field in a third style.

16. The computer readable medium of claim 15, wherein the instructions for decorating the first field comprises instructions for any one of:
coloring the first field;
outlining the first field;
generating a graphic associated with the first field; and
generating a sound associated with the first field.

* * * * *